US012714984B2

(12) United States Patent
Seong

(10) Patent No.: US 12,714,984 B2
(45) Date of Patent: Aug. 25, 2026

(54) METHOD FOR MANUFACTURING COFFEE ACTIVATED CARBON USING COFFEE WASTE, COFFEE ACTIVATED CARBON MANUFACTURED USING THE SAME, AND COMBI FILTER FOR VEHICLE AIR CONDITIONING SYSTEM INCLUDING COFFEE ACTIVATED CARBON

(71) Applicants: HYUNDAI MOTOR COMPANY, Seoul (KR); KIA CORPORATION, Seoul (KR)

(72) Inventor: Kwang Mo Seong, Bucheon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 474 days.

(21) Appl. No.: 18/236,116

(22) Filed: Aug. 21, 2023

(65) Prior Publication Data

US 2024/0382935 A1 Nov. 21, 2024

(30) Foreign Application Priority Data

May 18, 2023 (KR) ........................ 10-2023-0064256

(51) Int. Cl.
*B01J 20/30* (2006.01)
*B01D 46/00* (2022.01)
(Continued)

(52) U.S. Cl.
CPC ...... *B01J 20/3078* (2013.01); *B01D 46/0038* (2013.01); *B01D 53/02* (2013.01);
(Continued)

(58) Field of Classification Search
CPC .... B01D 46/0038; B01D 53/02; B01D 53/92; B01D 2253/102; B01D 2253/304; B01D 2253/306; B01D 2259/4566; B01J 20/20; B01J 20/28004; B01J 20/28066; B01J 20/3078; C01B 32/324
See application file for complete search history.

(56) References Cited

U.S. PATENT DOCUMENTS

2022/0227982 A1* 7/2022 Lee ........................ C08L 23/14

FOREIGN PATENT DOCUMENTS

JP 2009292670 A * 12/2009 ............ C01B 31/08
JP 2016-137801 A 8/2016
(Continued)

OTHER PUBLICATIONS

Machine translation of Kokubu et al (JP 2009292670). (Year: 2009).*
(Continued)

*Primary Examiner* — Brian A Mccaig
(74) *Attorney, Agent, or Firm* — MCDONNELL BOEHNEN HULBERT & BERGHOFF LLP

(57) ABSTRACT

A method for manufacturing coffee activated carbon using coffee waste includes performing a main treatment process of carbonizing and activating dried coffee powder particles and manufacturing coffee activated carbon, and performing a post-treatment process of sieving and drying the coffee activated carbon and selecting coffee activated carbon particles having a particle diameter of 185 μm to 864 μm.

20 Claims, 4 Drawing Sheets

(51) Int. Cl.
*B01D 53/02* (2006.01)
*B01J 20/20* (2006.01)
*B01J 20/28* (2006.01)

(52) U.S. Cl.
CPC ......... *B01J 20/20* (2013.01); *B01J 20/28004* (2013.01); *B01J 20/28066* (2013.01); *B01D 2253/102* (2013.01); *B01D 2253/304* (2013.01); *B01D 2253/306* (2013.01); *B01D 2259/4566* (2013.01)

(56) References Cited

FOREIGN PATENT DOCUMENTS

| | | | | | |
|---|---|---|---|---|---|
| KR | 2003-0028325 A | | 4/2003 | | |
| KR | 10-1176969 B1 | | 8/2012 | | |
| KR | 2017-0131784 A | | 11/2017 | | |
| KR | 10-1855589 B1 | | 5/2018 | | |
| KR | 20180125758 A | * | 11/2018 | .......... | B01J 20/3078 |
| KR | 10-2027061 B1 | | 11/2019 | | |
| KR | 2021-0147481 A | | 12/2021 | | |
| KR | 10-2414318 B1 | | 6/2022 | | |
| KR | 10-2478525 B1 | | 12/2022 | | |
| TW | M501369 | * | 5/2015 | ............... | B60H 3/06 |

OTHER PUBLICATIONS

Machine translation of Kuemmerle (TW M501369). (Year: 2015).*
Machine translation of Park et al (KR20180125758). (Year: 2018).*

* cited by examiner

METHOD FOR MANUFACTURING COFFEE ACTIVATED CARBON USING COFFEE WASTE, COFFEE ACTIVATED CARBON MANUFACTURED USING THE SAME, AND COMBI FILTER FOR VEHICLE AIR CONDITIONING SYSTEM INCLUDING COFFEE ACTIVATED CARBON

CROSS REFERENCE TO RELATED APPLICATIONS

This application claims benefit of priority to Korean Patent Application No. 10-2023-0064256 filed on May 18, 2023, in the Korean Intellectual Property Office, the disclosure of which is incorporated herein by reference in its entirety.

BACKGROUND

1. Field

The present disclosure relates to a method for manufacturing coffee activated carbon using coffee waste, coffee activated carbon manufactured using the same, and a combi filter for a vehicle air conditioning system including the coffee activated carbon.

2. Description of Related Art

Recently, as coffee consumption has gradually increased, the amount of discharged coffee residues (hereinafter referred to as 'coffee waste') remaining after processing coffee beans is also increasing. Specifically, only about 1 to 2% by weight of coffee beans are used as an undiluted coffee solution, and most of the coffee beans are discharged as coffee waste, resulting in a huge amount of coffee waste. Most such coffee waste is buried or incinerated, but there may be a problem in that groundwater may be contaminated when the coffee waste containing moisture and various organic materials is buried, and environments may be contaminated because greenhouse gases are discharged when the coffee waste is incinerated. Accordingly, there is a need to develop a technology for eco-friendly processing of coffee waste.

Meanwhile, countries are declaring carbon neutrality to cope with environmental pollution and climate change worldwide. As one of various measures to achieve such carbon neutrality, a method for using recycled materials for more than a certain percentage of materials applied to vehicles is being discussed.

On the other hand, as activated carbon applied to a combi filter for a vehicle air conditioning system, activated carbon manufactured by carbonizing and activating precursors formed of various carbon materials, such as wood, coal, lignite, and coconut shells, is mainly used. In this regard, Korean Unexamined Patent Application No. 10-2003-0028325 discloses applying activated carbon manufactured by carbonizing and activating coconut shells to a filter. However, environmental pollution and greenhouse gas emissions are caused in the process of securing wood, coal, lignite, and coconut shells as precursors, and since activated carbon formed of wood, coal, lignite and coconut shells is not a recycled material, the prior art is technology making it difficult to meet the purpose of carbon neutrality.

Accordingly, by recycling coffee waste to manufacture activated carbon applied to the combi filter for a vehicle air conditioning system without landfill or incineration, and as the coffee waste is treated in an environmentally friendly manner and meets the purpose of carbon neutrality at the same time, a technology for manufacturing activated carbon by recycling the coffee waste is being developed.

Accordingly, in order for activated carbon manufactured using coffee waste to replace activated carbon according to the conventional art, activated carbon manufacturing technology using coffee waste having dust collection efficiency and deodorization efficiency, similar to dust collection efficiency and deodorization efficiency of activated carbon according to the conventional art is required.

SUMMARY

An aspect of the present disclosure is to provide a method for manufacturing coffee activated carbon using coffee waste, coffee activated carbon manufactured using the same, and a combi filter for a vehicle air conditioning system having improved pressure loss, improved dust collection efficiency, an improved dust collection amount, and improved deodorization efficiency by including the coffee activated carbon.

According to an aspect of the present disclosure, provided is a method for manufacturing coffee activated carbon, the method including performing a main treatment process of carbonizing and activating dried coffee powder particles and manufacturing coffee activated carbon, and performing a post-treatment process of sieving and drying the coffee activated carbon and selecting coffee activated carbon particles having a particle diameter of 185 μm to 864 μm.

According to another aspect of the present disclosure, coffee activated carbon manufactured according to the method for manufacturing coffee activated carbon may have a BET specific surface area of 1000 $m^2/g$ or more and a particle diameter of 185 μm to 864 μm.

According to another aspect of the present disclosure, provided is a combi filter for a vehicle air conditioning system, including the coffee activated carbon.

In a method for manufacturing coffee activated carbon according to example embodiments of the present disclosure, the coffee activated carbon may be manufactured by performing a main process of manufacturing the coffee activated carbon by carbonizing and activating dried coffee powder particles, and performing a post-treatment process for selecting coffee activated carbon particles having a particle diameter of 185 μm to 864 μm by sieving and drying the coffee activated carbon, and a combi filter for a vehicle air conditioning system including the coffee activated carbon can have improved pressure loss, improved dust collection efficiency, improved dust collection amount, and improved deodorization efficiency.

Furthermore, the combi filter for a vehicle air conditioning system, including the coffee activated carbon manufactured according to the method for manufacturing coffee activated carbon, may have improved pressure loss, improved dust collection efficiency, an improved dust collection amount, and improved deodorization efficiency, and thus replace conventional activated carbon manufactured using wood, coal, lignite, and coconut shells, and accordingly, the method for manufacturing coffee activated carbon may be an eco-friendly technology that prevents environmental pollution generated during the conventional manufacturing of activated carbon and greenhouse gas discharge.

BRIEF DESCRIPTION OF THE FIGURES

The above and other aspects, features, and advantages of the present disclosure will be more clearly understood from the following detailed description, taken in conjunction with the accompanying drawings, in which.

DETAILED DESCRIPTION

Hereinafter, various embodiments according to the present disclosure will be described, but example embodiments may be modified into various different forms, and the scope thereof is not limited to the embodiments described below.

Method for Manufacturing Coffee Activated Carbon

A method for manufacturing coffee activated carbon using coffee waste according to the present disclosure will be described with reference to FIGS. 1 to 4. FIGS. 1 to 4 are flowcharts illustrating a method for manufacturing coffee activated carbon according to example embodiments of the present disclosure.

Figures 1, 2:
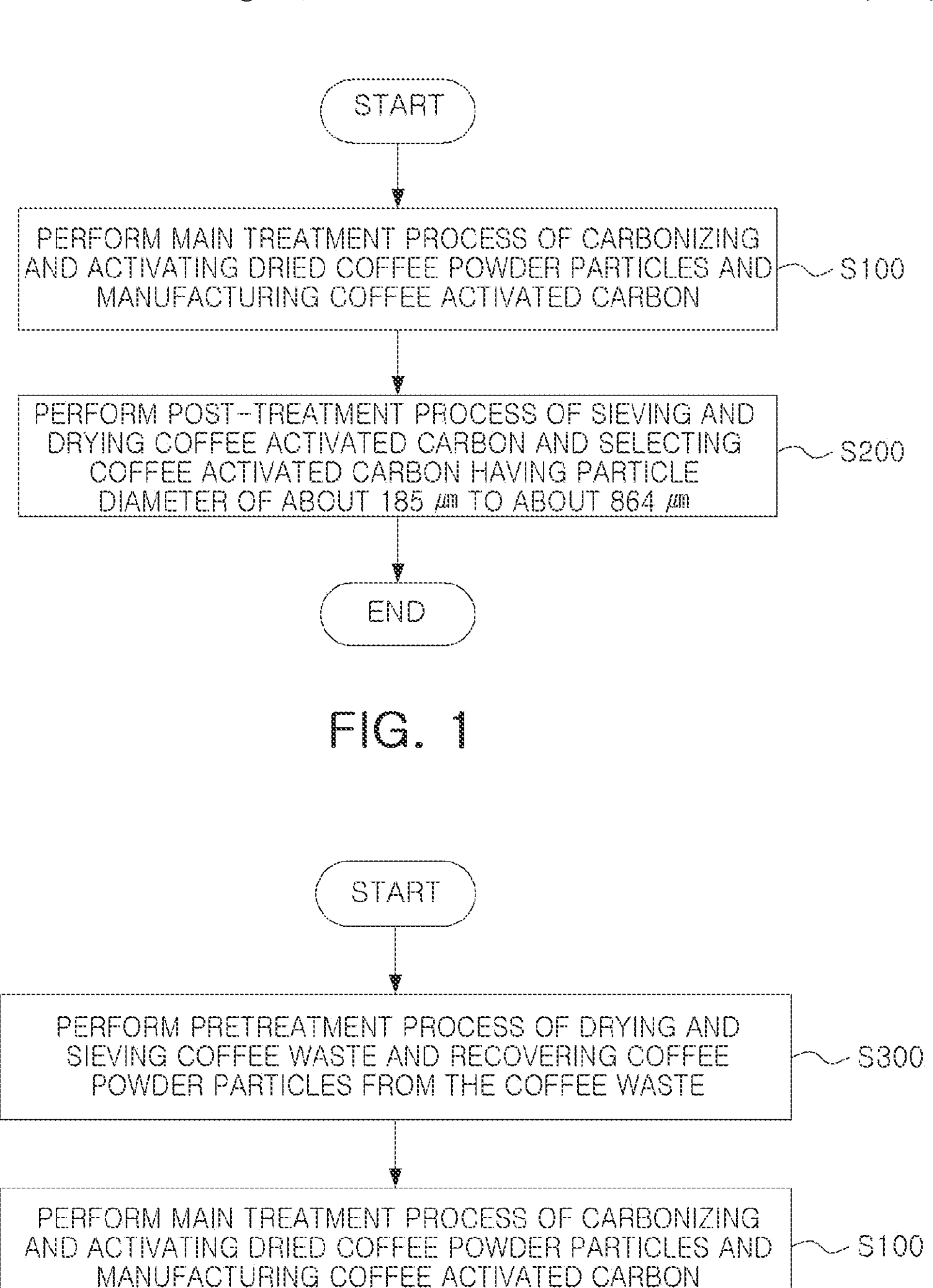
FIGS. 1, 2, 3, and 4 are flowcharts illustrating a method for manufacturing coffee activated carbon according to example embodiments of the present disclosure.

Referring to FIG. 1, a method for manufacturing coffee activated carbon according to example embodiments of the present disclosure may include an operation of performing a main treatment process (S100) and an operation of performing a post-treatment process (S200).

First, the main treatment process of manufacturing the coffee activated carbon by carbonizing and activating dried coffee powder particles may be performed. Then, the main treatment process of manufacturing the coffee activated carbon by carbonizing and activating the coffee powder particles may be performed. Then, the post-treatment process of selecting coffee activated carbon having a particle diameter of about 185 μm to about 864 μm by sieving and drying the coffee activated carbon may be performed.

Referring to FIG. 2, in an example embodiment, the dried coffee powder particles may be obtained by a pretreatment process of recovering the coffee powder particles from coffee waste by drying and sieving the coffee waste (S300). Specifically, the dried coffee powder particles may be obtained by the pretreatment process including an operation of performing a first drying process of drying the coffee waste to remove moisture, and an operation of performing a first sieving process of sieving the dried coffee waste and recovering the coffee powder particles from the coffee waste.

In the pretreatment process, first, the first drying process of removing moisture by drying the coffee waste may be performed.

In example embodiments, the coffee waste may include about 60 wt % or more of moisture based on a total weight of the coffee waste, and the coffee waste dried through the first drying process may include about 10 wt % to about 15 wt % or less of moisture based on the total weight of the coffee waste.

In an example embodiment, the first drying process may be performed by adding the coffee waste to an oven device and drying the coffee waste at a temperature of about 100° C. to about 120° C. for about 2 to about 5 hours.

Then, the first sieving process of sieving the coffee waste to remove foreign substances such as vinyl from the coffee waste and recovering coffee powder particles may be performed.

In the operation of performing the first sieving process, the coffee waste may be sieved with a sieve having a sieve opening of about 1900 μm to about 4040 μm to obtain coffee powder particles having a particle diameter of about 4040 μm or less. As the foreign substances included in the coffee waste are removed through the first sieving process, the coffee powder particles having particle diameters having the above-described range may be recovered, and contamination and heat transfer efficiency reduction due to the foreign substances may be prevented in a main treatment process described below, thereby manufacturing high-quality coffee activated carbon.

In an example embodiment, the first sieving process may be performed by adding the coffee waste to a vibrating screening device and performing a vibrating screening treatment for about 10 to 30 minutes.

Meanwhile, in the operation of performing the pretreatment process, the first drying process may be performed after the first sieving process is performed.

Specifically, the dried coffee powder particles may be obtained by the pretreatment process including an operation of performing the first sieving process of sieving the coffee waste to recover the coffee powder particles from the coffee waste, and an operation of performing a first drying process of drying the coffee powder particles to remove moisture therefrom.

Accordingly, after the foreign substances such as vinyl are first removed from the coffee waste through the first sieving process to receive the coffee powder particles, the moisture included in the coffee powder particles may be removed through the first drying process.

Figures 3, 4:
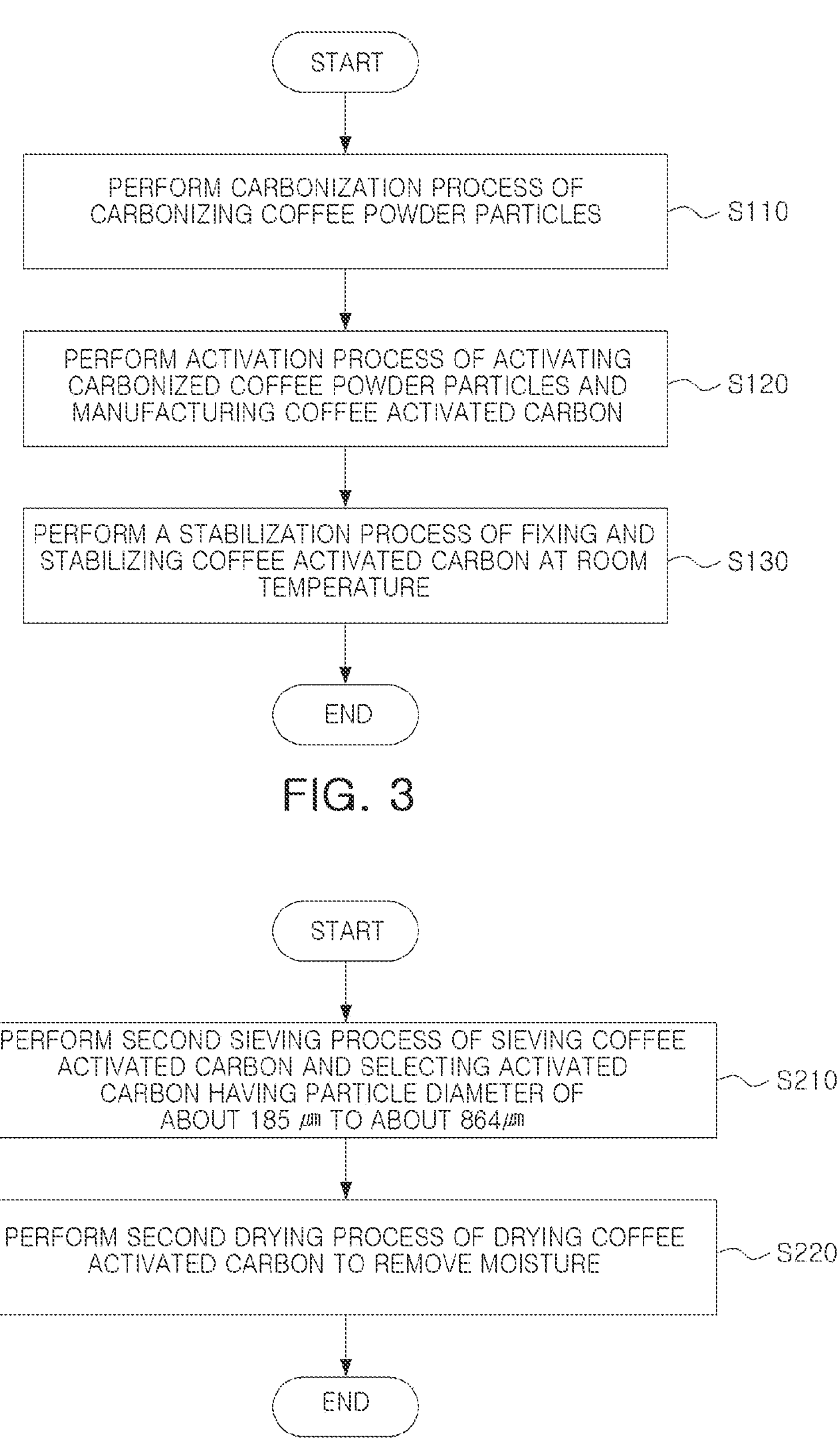

Referring to FIGS. 1 and 3, the operation of performing the main treatment process (S100) may include an operation of performing a carbonization process (S110) and an operation of performing an activation process (S120).

First, the carbonization process for carbonizing the coffee powder particles may be performed.

In the operation of performing the carbonization process (S110), the coffee powder particles may be added to a thermal decomposition furnace and carbonized at a temperature of about 300° C. to about 750° C.

Because moisture and volatile carbon are volatilized in the coffee powder particles through the carbonization process, the coffee powder particles may only include fixed carbon. Meanwhile, the moisture and the volatile carbon may be gasified and discharged to the outside by the thermal decomposition.

When the coffee powder particles are carbonized at a temperature of less than about 300° C., volatilization of moisture and volatile carbon may be insufficient, which may cause organic materials to remain. When the coffee powder particles are carbonized at a temperature of more than about 750° C., a large amount of energy or fuel may be required, which may increase manufacturing costs of the coffee activated carbon.

In an example embodiment, the carbonization process may be performed for about 1 to about 4 hours.

In an example embodiment, the thermal decomposition furnace may be in an inert state. Specifically, the thermal decomposition furnace may be in an inert state by adding an inert gas into the thermal decomposition furnace or recirculating a portion of an exhaust gas discharged through an outlet to the thermal decomposition furnace. The exhaust gas may include, for example, carbon dioxide ($CO_2$).

In an example embodiment, the inert gas may include, for example, at least one selected from the group consisting of nitrogen ($N_2$), carbon dioxide ($CO_2$), and argon (Ar).

Then, the activation process of manufacturing the coffee activated carbon by activating carbonized coffee powder particles may be performed.

In the operation of performing the activation process (S120), the carbonized coffee powder particles and active gas may be added to the thermal decomposition furnace to activate the carbonized coffee powder particles at a temperature of about 900° C. to about 1100° C. to manufacture the coffee activated carbon.

In an example embodiment, the activation process may be performed for about 2 to about 6 minutes.

Through the activation process, the coffee activated carbon may have a pore structure. Specifically, pores having various sizes such as macropores, mesopores, and micropores may be formed in the coffee activated carbon through the activation process.

Accordingly, the coffee activated carbon may have a high BET specific surface area.

In an example embodiment, the coffee activated carbon may have a BET specific surface area of about 1000 $m^2/g$ or more. A combi filter for a vehicle air conditioning system including the coffee activated carbon having a BET specific surface area in the above-described range may have excellent pressure loss, excellent dust collection efficiency, an excellent dust collection amount, and excellent deodorization efficiency.

When the coffee powder particles are activated at a temperature of less than about 900° C., because the micropores are not sufficiently formed in the coffee activated carbon, the coffee activated carbon may not have a BET specific surface area of about 1000 $m^2/g$ or more. When the coffee powder particles are activated at a temperature of more than about 1,100° C., a large amount of energy or fuel may be required, which may increase manufacturing costs of coffee activated carbon.

In an example embodiment, the active gas may include, for example, at least one selected from the group consisting of steam ($H_2O$), carbon dioxide ($CO_2$), potassium hydroxide (KOH), sodium hydroxide (NaOH), potassium carbonate ($K_2CO_3$), zinc chloride ($ZnCl_2$), and phosphoric acid ($H_3PO_4$).

Meanwhile, agglomeration between the coffee powder particles may occur in the process of forming the coffee powder particles into the coffee activated carbon through the carbonization process and the activation process, which may increase a particle diameter of the coffee activated carbon. Specifically, the coffee activated carbon may have a particle diameter distribution of about 10 μm to about 5000 μm or less.

In example embodiments, the operation of performing the main treatment process (S100) may further include an operation of performing a stabilization process of fixing and stabilizing the coffee activated carbon at room temperature (S130) after performing the activation process (S120). In this case, the room temperature is, for example, about 5° C. to about 40° C., or about 10° C. to about 30° C., or about 15° C. to 25° C., preferably about 25° C.

The pore structure of the coffee activated carbon may be stabilized through the stabilization process.

In an example embodiment, the stabilization process may be performed for about 2 to about 6 hours.

Referring to FIGS. 1 and 4, the operation of performing the post-treatment process (S200) may include an operation of performing a second sieving process (S210) and an operation of performing a second drying process (S220).

First, the second sieving process of sieving the coffee activated carbon and selecting coffee activated carbon particles having a particle diameter of about 185 μm to about 864 μm may be performed.

In the operation of performing the second sieving process (S210), the coffee activated carbon may be sieved with a sieve having a sieve opening of about 185 μm to about 864 μm.

The combi filter for a vehicle air conditioning system including the coffee activated carbon having the particle diameter in the above-described range may have excellent pressure loss, excellent dust collection efficiency, an excellent dust collection amount, and excellent deodorization efficiency. Furthermore, because the coffee activated carbon having the particle diameter in the above-described range is not scattered during the manufacturing of the combi filter, contamination of manufacturing equipment by the coffee activated carbon may be prevented and the manufacturing environment may be improved.

In an example embodiment, the second sieving process may be performed by adding the coffee activated carbon into a vibrating screening device and performing vibrating screening treatment for about 1 to about 3 hours.

In example embodiments, the operation of performing the post-treatment process (S200) may further include an operation of performing a grinding process of grinding the coffee activated carbon before the operation of performing the second sieving process (S210).

In the operation of performing the grinding process, the coffee activated carbon may be ground to have an average particle diameter $D_{50}$ of about 320 μm. As the coffee activated carbon is ground to have the average particle diameter $D_{50}$ in the above-described range, the coffee activated carbon having a particle diameter of about 185 μm to about 864 μm may be more smoothly selected in the second sieving process.

In an example embodiment, the grinding process may be performed by adding the coffee activated carbon to a grinding device such as a blade mill and grinding the coffee activated carbon to about 1000 g/hr.

Then, the second drying process of removing moisture by drying the coffee activated carbon selected by the second sieving process may be performed.

In the operation of performing the second drying process (S220), moisture adsorbed into pores of the coffee activated carbon may be removed to include about 5 wt % or less of moisture based on the total weight of the coffee activated carbon. Since the coffee activated carbon includes moisture in the above-described range, the moisture may be attached to an adsorption point to a surface of the coffee activated carbon instead of gas, thereby minimizing a decrease in deodorization efficiency.

In an example embodiment, the first drying process may be performed by adding the coffee waste into an oven device and drying the coffee waste at a temperature of about 100° C. to about 120° C. for about 1 to about 2 hours.

In example embodiments, after performing the first drying process, a sealing process of sealing the coffee activated carbon may be performed. By performing the sealing process, pollutants in the atmosphere may be prevented from being adsorbed to the coffee activated carbon.

Accordingly, the manufacturing of the coffee activated carbon may be completed.

As described above, the coffee activated carbon may be manufactured by performing the main treatment process of carbonizing and activating the dried coffee powder particles and manufacturing the coffee activated carbon, and performing the post-treatment process of sieving and drying the coffee activated carbon and selecting coffee activated carbon particles having a particle diameter of about 185 μm to about 864 μm, and the combi filter for a vehicle air conditioning system including the coffee activated carbon may have improved pressure loss, improved dust collection efficiency, an improved dust collection amount, and improved deodorization efficiency.

On the other hand, in the case of conventionally manufacturing activated carbon using wood, coal, lignite, and coconut shells, environmental pollution and greenhouse gas emissions may occur in the process of securing wood, coal, lignite, and coconut shells, and manufacturing the activated carbon. However, the combi filter for a vehicle air conditioning system including the coffee activated carbon manufactured according to the method for manufacturing coffee activated carbon of the present disclosure may have improved pressure loss, improved dust collection efficiency, an improved dust collection amount, and improved deodorization efficiency, and thus replace conventional activated carbon manufactured using wood, coal, lignite, and coconut shells, and accordingly, the method for manufacturing coffee activated carbon may be an eco-friendly technology that prevents environmental pollution generated during the conventional manufacture of activated carbon and greenhouse gas discharge.

Method for Manufacturing Combi Filter for Vehicle Air Conditioning System

Figure 5:
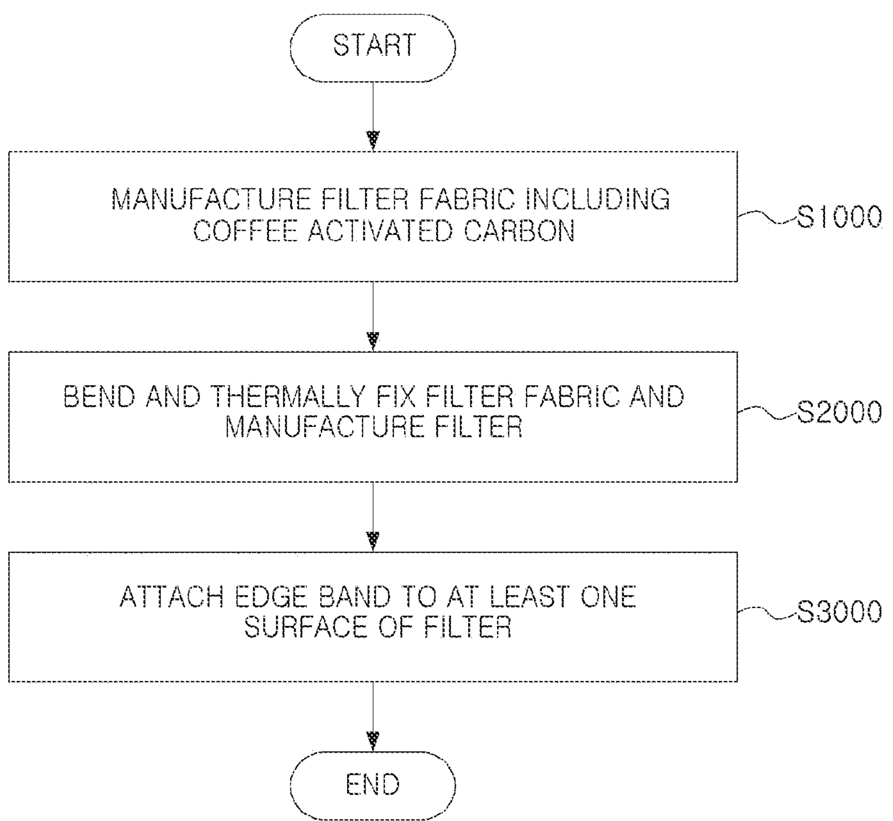
FIG. 5 is a flowchart illustrating a method for manufacturing a combi filter for a vehicle air conditioning system according to example embodiments of the present disclosure.

Hereinafter, a method for manufacturing a combi filter for a vehicle air conditioning system according to the present disclosure will be described referring to FIGS. 5 to 7. FIG. 5 is a flowchart illustrating a method for manufacturing a combi filter for a vehicle air conditioning system according to example embodiments of the present disclosure, and FIGS. 6 and 7 are cross-sectional views illustrating a filter fabric used in a method for manufacturing a combi filter for a vehicle air conditioning system according to example embodiments of the present disclosure.

Figure 6:
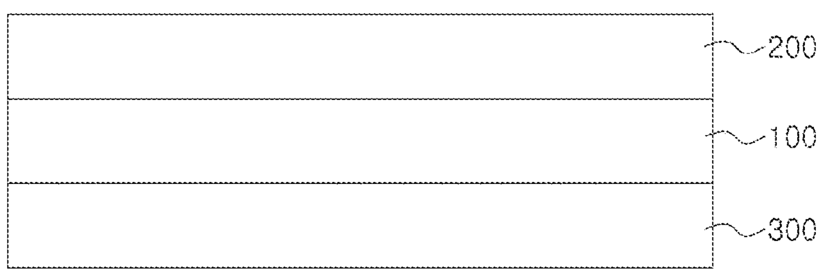
FIGS. 6 and 7 are cross-sectional views illustrating a filter fabric used in a method for manufacturing a combi filter for a vehicle air conditioning system according to example embodiments of the present disclosure.
Figure 7:
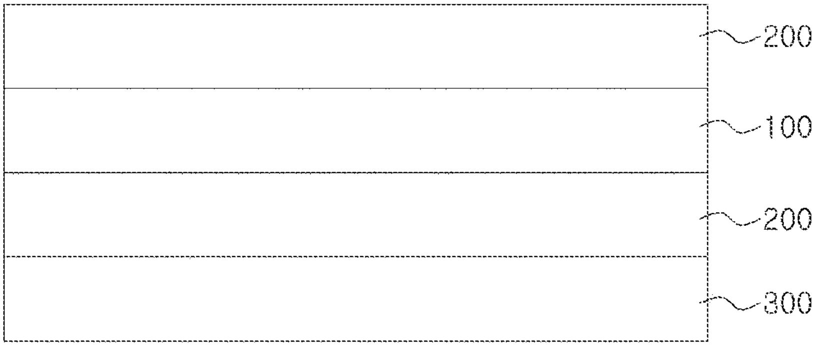

According to FIGS. 5 to 7, the method for manufacturing a combi filter for a vehicle air conditioning system according to example embodiments of the present disclosure may include an operation of manufacturing a filter fabric 10 including the coffee activated carbon (S1000), an operation of manufacturing a filter by bending and thermally fixing the filter fabric 10 (S2000), and an operation of attaching an edge band to at least one surface of the filter (S3000).

First, the filter fabric 10 including the coffee activated carbon may be manufactured.

The operation of producing the filter fabric 10 (S1000) may include an operation of forming an adsorption layer 100 including the coffee activated carbon, an operation of forming a support layer 200 including a nonwoven fabric on at least one surface of the adsorption layer 100, and an operation of forming a dust collecting layer 300 on the adsorption layer 100 or the support layer 200.

As the adsorption layer 100 includes the coffee activated carbon, the combi filter may perform an adsorption function such as dust collection and deodorization.

The support layer 200 perform a function of fixing the adsorption layer 100 and maintaining a shape of the filter fabric 10, and the support layer 200 may be used without limitation as long as it is commonly used to perform such a function. In an example embodiment, the nonwoven fabric included in the support layer 200 may include, for example, at least one selected from the group consisting of polyethylene terephthalate (PET), polypropylene (PP), and polyurethane (PU).

The dust collecting layer 300 performs a function of collecting dust in the combi filter, and the dust collecting layer 300 may be used without limitation as long as it is commonly used to perform such a function. In an example embodiment, the dust collecting layer 300 may include, for example, at least one selected from the group consisting of polyethylene terephthalate (PET), polypropylene (PP), and polyurethane (PU).

Meanwhile, the filter fabric 10 may be manufactured to have various multilayer structures.

Specifically, in an example embodiment, the filter fabric 10 may be manufactured by forming the adsorption layer 100, forming the support layer 200 on one side of the adsorption layer 100, and then forming the dust collection layer 300 on the other side of the adsorption layer 100 (see FIG. 6).

In an example embodiment, the filter fabric 10 may be manufactured by forming the adsorption layer 100, forming the support layers 200 on both sides of the adsorption layer 100, and then forming the dust collection layer 300 on one of the support layers 200 (see FIG. 7).

Then, the filter may be manufactured by bending and thermally fixing the filter fabric 10.

The operation of manufacturing the filter (S2000) may include an operation of bending the filter fabric 10 at intervals of about 10 mm to about 30 mm, and an operation of manufacturing the filter by thermally fixing the bent filter fabric at a temperature of about 80° C. or higher. As the filter fabric is bent, it may have a bend valley.

In an example embodiment, the bent filter fabric may be thermally fixed at a rate of about 52 valley/min.

In an example embodiment, the operation of manufacturing the filter (S2000) may further include an operation of cutting the filter according to a size of an applied combi filter after the operation of manufacturing the filter.

Then, an edge band may be attached to at least one surface of the filter.

In example embodiments, the edge band may be attached to at least two surfaces of the filter.

The edge band may perform a function of fixing the filter, and the edge band may be used without limitation as long as it is generally used to perform the function. In an example embodiment, the edge band may include, for example, polyethylene terephthalate.

Accordingly, the manufacturing of the combi filter for a vehicle air conditioning system may be completed.

EXAMPLE

Hereinafter, the present disclosure will be described in more detail with reference to specific example embodiments. However, the following inventive example illustrates an example embodiment of the present invention, and the present disclosure is not limited thereto.

Inventive Example 1

After preparing a coffee waste including 60 wt % of moisture based on a total weight of the coffee waste, the coffee waste was added to an oven device (S-SHOV150) of SCENG Co., Ltd., and was dried at a temperature of 120° C. for 4 hours. The dried coffee waste includes 13 wt % of moisture based on the total weight of the coffee waste.

Then, the coffee waste was added to a vibrating screening device (XZS400) of Hwashin Machinery Co., Ltd., and was subjected to vibrating screening for 30 minutes. Specifically, the coffee waste was sieved with a sieve having a sieve opening of 1900 μm to recover coffee powder particles.

Then, an average particle diameter $D_{50}$ of the coffee powder particles was measured using ZEN3600 of Malvern Instruments. In this case, the average particle diameter $D_{50}$ of the coffee powder particles was measured to be 400 μm.

Then, the coffee powder particles were added to a thermal decomposition furnace of Korea Thermo Tech Co., Ltd., and were carbonized at a temperature of 750° C. for 1 hour. On the other hand, when carbonizing the coffee powder particles, carbon dioxide ($CO_2$) was added to the thermal decomposition furnace so that the thermal decomposition furnace is maintained in an inert state.

Then, steam ($H_2O$) was added to the thermal decomposition furnace to activate the carbonized coffee powder particles at a temperature of 1100° C. for 3 minutes. Accordingly, the coffee activated carbon having a pore structure was prepared.

Then, a BET specific surface area of the coffee activated carbon was measured using ASAP2420 of Micromeritics. Specifically, helium was used as a carrier gas, nitrogen was used as an adsorption gas, and a BET specific surface area was measured by 5 predefined points method of BET relative pressure ($P/P_0$ where P is actual measurement pressure, and $P_0$ is saturation pressure) by continuous flow. In this case, the BET specific surface area of the coffee activated carbon was measured to be 1380 $m^2/g$.

Furthermore, the average particle diameter $D_{50}$ of the coffee activated carbon was measured using ZEN3600 of Malvern Instruments. In this case, the average particle diameter $D_{50}$ of the coffee activated carbon was measured to be 850 μm.

Then, the coffee activated carbon was fixed at room temperature (25° C.) and stabilized for 4 hours.

Then, the coffee activated carbon was added to the vibrating screening device (XZS400) of Hwashin Machinery Co., Ltd., and was subjected to vibrating screening for 2 hours. Specifically, the coffee waste was sieved through a sieve opening of 185 μm and 864 μm to select the coffee activated carbon.

Then, the particle diameter of the coffee activated carbon was measured using ZEN3600 of Malvern Instruments. In this case, the particle diameter of the coffee activated carbon was measured to be 185 μm to 864 μm.

Then, the coffee activated carbon was added to the oven device (S-SHOV150) of SCENG Co., Ltd., and was dried at a temperature of 100° C. for 2 hours. The dried coffee activated carbon included 5 wt % of moisture based on the total weight of the coffee activated carbon.

Accordingly, the coffee activated carbon of Inventive Example 1 was manufactured.

Comparative Example 1

Activated carbon of Comparative Example 1 is coconut activated carbon manufactured using coconut shells, and has the same BET specific surface area and average particle diameter $D_{50}$ as those of the coffee activated carbon of Inventive Example 1.

Comparative Example 2

In the same manner as in the method for manufacturing coffee activated carbon in Inventive Example 1, coffee activated carbon was manufactured by recovering coffee powder particles by drying and sieving coffee waste, and carbonizing, activating, and stabilizing the coffee powder particles.

Then, the coffee activated carbon was dried immediately without vibrating screening treatment, thus manufacturing the coffee activated carbon of Comparative Example 2.

Manufacture of Combi Filter for Vehicle Air Conditioning System

An adsorption layer including the activated carbon of Inventive Example 1 and Comparative Examples 1 and 2, respectively, was formed, a support layer was formed on one surface of the adsorption layer, and the dust collection layer was formed on the other surface of the adsorption layer to manufacture the filter fabric. In this case, the support layer includes a polyester nonwoven fabric, and the dust collecting layer includes polypropylene.

Then, the filter fabric was bent at intervals of 30 mm using a knife-type bending device, and the bent filter fabric was thermally fixed at a temperature of 80° C. at a rate of 52 valley/min using a fixing device of a thermally fixed manner, thus manufacturing a filter.

Then, the filter was cut to a size of 227 mm wide*210 mm long*30 mm high, and then the edge band formed of a PET material was attached by applying a hot melt to two sides to four sides of the filter.

Accordingly, the combi filter for a vehicle air conditioning system of Inventive Example 1-1 and Comparative Examples 1-1 and 2-1, including the activated carbon of Inventive Example 1 and Comparative Examples 1 and 2, respectively, was manufactured.

Pressure Loss Assessment

For the combi filters for a vehicle air conditioning system in Inventive Example 1-1 and Comparative Examples 1-1 and 2-1, a pressure loss was evaluated depending on test regulations DIN 71460-1, respectively.

Specifically, after stabilizing a test air volume of an evaluation device to 300 CMH, inlet pressure $P_1$ and outlet pressure $P_2$ were measured in a state in which the combi filter is not installed on the evaluation device, respectively, and the combi filter was mounted in the evaluation device, and also, after stabilizing the test air volume of the evaluation device to 300 CMH, inlet input pressure $P_3$ and outlet pressure $P_4$ of the combi filter were measured, respectively, and a pressure loss P was evaluated according to Equation 1 below. A pressure loss was evaluated for three or more combi filters, and an average value of pressure loss values thereof was used as a final pressure loss value.

$$P[\text{Pa}] = (P_3 - P_4) - (P_1 - P_2) \quad \text{Equation 1}$$

Dust Collection Efficiency Evaluation

Dust collection efficiency was evaluated in accordance with the test regulations DIN 71460-1 for the combi filters for a vehicle air conditioning system in Inventive Example 1-1 and Comparative Examples 1-1 and 2-1, respectively.

Specifically, the combi filter was mounted in the evaluation device, and the test air volume of the evaluation device was stabilized to 300 CMH, and then, ISO A2 fine dust was supplied at 10±2 $mg/m^3$. After stabilizing a dust concentration for 10 seconds by operating a dust gauge, an inlet concentration $C_1$ and an outlet concentration $C_2$ of the combi filter were measured, respectively, and dust collection efficiency & was evaluated according to Equation 2 below. The dust collection efficiency was evaluated for three or more combi filters, and an average value of dust collection efficiency values thereof was used as a final dust collection efficiency value.

$$\varepsilon[\%] = (1 - C_2/C_1) \times 100 \qquad \text{Equation 2}$$

Evaluation of Dust Collection Amount

The amount of dust collection was evaluated according to the test regulations DIN 71460-1 for the combi filters for vehicle air conditioning systems in Inventive Example 1-1 and Comparative Examples 1-1 and 2-1, respectively.

Specifically, an initial weight ($W_1$) of the combi filter was measured, the test air volume was stabilized to 300 CMH after the combi filter was mounted in the evaluation device, and initial pressure loss was measured. ISO A2 fine dust was supplied at 75±5 mg/m$^3$ until the pressure loss was measured to be +50 Pa as compared to the initial pressure loss, and the dust supply was stopped when the pressure loss was measured to be +50 Pa as compared to the initial pressure loss. After removing the combi filter, a final weight $W_2$ of the combi filter was measured, and after measuring an area A of the filter of the combi filter, a dust collection amount L was evaluated according to Equation 3 below. Dust collection amounts were evaluated for three or more combi filters, and an average value of dust collection values thereof was used as a final dust collection value.

$$L[\text{mg/m}^2] = (W_2 - W_1)/A \qquad \text{Equation 3}$$

Evaluation of Deodorization Efficiency

Combi filters for a vehicle air conditioning system in Inventive Example 1-1 and Comparative Examples 1-1 and 2-1 were evaluated in accordance with the test regulations DIN 71460-2, respectively.

Specifically, the combi filter was stabilized in a standard state for 24 hours or more. Then, an interior of the evaluation device was purged and cleaned using $N_2$ gas for 15 minutes at least once before supplying gas to be evaluated, a test air volume of the evaluation device was set to 150 CMH, and supply concentration conditions for each gas to be evaluated (Toluene 80±8 ppm, n-Butane 80±8 ppm, $SO_2$ 30±3 ppm) were set. Then, the evaluation was advanced by mounting the combi filter in the evaluation device, and applying the test air volume and the supply concentration for each gas to be evaluated. A time at which the concentration of each gas to be evaluated at an inlet of the combi filter reaches an evaluation reference concentration was set as an evaluation start time, the inlet concentration $C_1$ and the outlet concentration $C_2$ of the combi filter were measured one minute later, and deodorization efficiency E was evaluated according to Equation 4 below. The deodorization efficiency was evaluated for three or more combi filters, and an average value of deodorization efficiency values thereof was used as a final deodorization efficiency value.

$$E[\%] = (1 - C_2/C_1) \times 100 \qquad \text{Equation 4}$$

Evaluation results for pressure loss, dust collection efficiency, a dust collection amount, and deodorization efficiency of the combi filters for a vehicle air conditioning system according to Inventive Example 1-1 and Examples 1-1 and 2-1 are shown in Table 1 below.

TABLE 1

| | | Inventive Example 1-1 | Comparative Example 1-1 | Comparative Example 2-1 |
|---|---|---|---|---|
| Pressure Loss (Pa) | | 80 | 81 | 112 |
| Dust Collection Efficiency (%) | | 97.6 | 97.6 | 98.4 |
| Dust Collection Amount (g/m$^2$) | | 15.3 | 17 | 2.2 |
| Deodorization Efficiency (%) | n-butane | 80 | 72 | 70 |
| | Toluene | 91 | 88 | 91 |
| | Sulfur dioxide | 76 | 79 | 88 |

As can be seen from Table 1, it was confirmed that the combi filter for a vehicle air conditioning system of Inventive Example 1-1 had pressure loss, dust collection efficiency, dust collection amount, and deodorization efficiency superior or similar to those of the combi filter for a vehicle air conditioning system of Comparative Example 1-1. Specifically, it was confirmed that the combi filter for a vehicle air conditioning system of Inventive Example 1-1 had better pressure loss, n-butane deodorization efficiency, and toluene deodorization efficiency than the combi filter for a vehicle air conditioning system of Comparative Example 1-1, had the same dust collection efficiency as that of the combi filter for a vehicle air conditioning system of Comparative Example 1-1, and had a dust collection amount and sulfur dioxide deodorization efficiency similar to those of the combi filter for a vehicle air conditioning system of Comparative Example 1-1. Based on these results, it is determined that the combi filter for a vehicle air conditioning system of Inventive Example 1-1 has excellent pressure loss, excellent dust collection efficiency, an excellent dust collection amount, and excellent deodorization efficiency, by including the coffee activated carbon of Inventive Example 1. From this, it may be seen that the combi filter for a vehicle air conditioning system including the coffee activated carbon manufactured according to the method for manufacturing the coffee activated carbon according to the present disclosure has excellent pressure loss, excellent dust collection efficiency, an excellent dust collection amount, and excellent deodorization efficiency. Accordingly, it may be seen that the coffee activated carbon manufactured according to the method for manufacturing the coffee activated carbon of the present disclosure may replace the activated carbon manufactured using the coconut shells.

Furthermore, it was confirmed that the combi filter for a vehicle air conditioning system of Inventive Example 1-1 has better pressure loss and a better dust collection amount than the combi filter for a vehicle air conditioning system of Comparative Example 1-2. From this, it may be seen that the method for manufacturing the coffee activated carbon of the present disclosure includes the operation of performing the second sieving process, thereby improving the pressure loss and the dust collection amount of the combi filter for a vehicle air conditioning system.

Although example embodiments of the present disclosure have been described in detail above, this is merely exemplary, and those skilled in the art will understand that various modifications and equivalent other embodiments are possible therefrom. Accordingly, the true technical protection scope of the present disclosure shall be determined by the technical concept of the appended claims.

The specific executions described in the example embodiments are example embodiments and do not in any way limit the scope of the example embodiments. In addition, if a component has no specific mention such as “essential” or “important,” it may not be an essential component for an application of the present disclosure.

The use of the term “the” and similar indicative terms in the specification of the example embodiment (especially in the scope of the claims) may correspond to both singular and plural forms. In addition, when the range is described in the example embodiment, it includes an invention applying individual values belonging to the range (unless otherwise described), and each individual value constituting the range is described in the detailed description. Finally, if there is no clear order or contrary description for the operations constituting the method according to the example embodiment, the operations may be performed in an appropriate order. The example embodiments are not necessarily limited according to the order of description of the operations. In the example embodiments, the use of all examples or exemplary terms (e.g., and the like, or the like) is simply meant to describe the example embodiments in detail, and unless limited by the claims, the scope of the example embodiment is not limited by the examples or exemplary terms. In addition, it may be seen by those skilled in the art that the example embodiments may be configured according to design conditions and factors within the scope of the claims or their equivalents to which various modifications, combinations, and changes are added.

The invention claimed is:

1. A method for manufacturing coffee activated carbon particles, the method comprising:

performing, by a thermal decomposition furnace, a main treatment process of carbonizing and activating dried coffee powder particles and manufacturing coffee activated carbon; and performing a post-treatment process of sieving, by a sieve, and drying, by an oven device, the coffee activated carbon and selecting coffee activated carbon particles having a particle diameter of 185 μm to 864 μm, wherein the method of manufacturing coffee activated carbon particles does not comprise a metal impregnation process.

2. The method for manufacturing coffee activated carbon particles according to claim 1, wherein the dried coffee powder particles are obtained through a pretreatment process, wherein the pretreatment process comprises:

performing a first drying process of drying coffee waste to remove moisture; and performing, by the sieve, a first sieving process of sieving the dried coffee waste and recovering the coffee powder particles from the dried coffee waste.

3. The method for manufacturing coffee activated carbon particles according to claim 2, wherein in the performing a first sieving process, the coffee waste is sieved with the sieve which has an opening of 1900 μm to 4040 μm.

4. The method for manufacturing coffee activated carbon particles according to claim 1, wherein the dried coffee powder particles are obtained through a pretreatment process, wherein the pretreatment process comprises:

performing, by the sieve, a first sieving process of sieving coffee waste and recovering coffee powder particles from the coffee waste; and performing, by the oven device, a first drying process of drying the coffee powder particles to remove moisture.

5. The method for manufacturing coffee activated carbon particles according to claim 1, wherein performing the main treatment process comprises:

performing, by the thermal decomposition furnace, a carbonization process of carbonizing the dried coffee powder particles; and performing an activation process of activating the carbonized coffee powder particles and manufacturing the coffee activated carbon.

6. The method for manufacturing coffee activated carbon particles according to claim 5, wherein during the carbonization process, the coffee powder particles are added to a thermal decomposition furnace and are carbonized at a temperature of 300° C. to 750° C.

7. The method for manufacturing coffee activated carbon particles according to claim 6, wherein an inert gas is added to the thermal decomposition furnace to carbonize the coffee powder particles, and the inert gas is at least one selected from the group consisting of nitrogen ($N_2$), carbon dioxide ($CO_2$), and argon (Ar).

8. The method for manufacturing coffee activated carbon particles according to claim 5, wherein, in the activation process, the carbonized coffee powder particles and active gas are added to a thermal decomposition furnace, and the carbonized coffee powder particles are activated at a temperature of 900° C. to 1,100° C. to manufacture the coffee activated carbon.

9. The method for manufacturing coffee activated carbon particles according to claim 8, wherein the active gas is at least one selected from the group consisting of steam ($H_2O$), carbon dioxide ($CO_2$), potassium hydroxide (KOH), sodium hydroxide (NaOH), potassium carbonate ($K_2CO_3$), zinc chloride ($ZnCl_2$), and phosphoric acid ($H_3PO_4$).

10. The method for manufacturing coffee activated carbon particles according to claim 5, wherein the main treatment process further comprises:

after performing the activation process, performing a stabilization process for fixing and stabilizing the coffee activated carbon particles at a temperature of 5 to 40° C. for 2 to 6 hours.

11. The method for manufacturing coffee activated carbon particles according to claim 1, wherein performing the post-treatment process comprises:

performing a second sieving process of sieving the coffee activated carbon and selecting coffee activated carbon particles having a particle diameter of 185 μm to 864 μm; and performing a second drying process of drying the coffee activated carbon particles selected by the second sieving process to remove moisture.

12. The method for manufacturing coffee activated carbon particles according to claim 11, wherein in the second sieving process, the coffee activated carbon is sieved with an opening of 185 μm to 864 μm.

13. The method for manufacturing coffee activated carbon particles according to claim 12, wherein in the second sieving process, the coffee activated carbon particles include 5 wt % or less of moisture based on a total weight of the coffee activated carbon particles by removing the moisture.

14. Coffee activated carbon particles manufactured according to the method for manufacturing coffee activated carbon particles according to claim 1, wherein the coffee activated carbon particles have a BET specific surface area of 1000 $m^2/g$ or more and a particle diameter of 185 μm to 864 μm.

15. A combi filter for a vehicle air conditioning system, the combi filter including the coffee activated carbon particles of claim 14.

16. A method for manufacturing coffee activated carbon particles, the method consisting of:

performing, by a thermal decomposition furnace, a main treatment process of carbonizing and activating dried coffee powder particles and manufacturing coffee activated carbon; and performing a post-treatment process of sieving, by a sieve, and drying, by an oven device, the coffee activated carbon and selecting coffee activated carbon particles having a particle diameter of 185 μm to 864 μm.

17. The method for manufacturing coffee activated carbon particles according to claim 16, wherein performing the main treatment process comprises:

performing, by the thermal decomposition furnace, a carbonization process of carbonizing the dried coffee powder particles; and performing an activation process of activating the carbonized coffee powder particles and manufacturing the coffee activated carbon.

18. The method for manufacturing coffee activated carbon particles according to claim 16, wherein, in the activation process, the carbonized coffee powder particles and active gas are added to a thermal decomposition furnace, and the carbonized coffee powder particles are activated at a temperature of 900° C. to 1,100° C. to manufacture the coffee activated carbon.

19. A method for manufacturing coffee activated carbon particles, the method consisting essentially of:

performing, by a thermal decomposition furnace, a main treatment process of carbonizing and activating dried coffee powder particles and manufacturing coffee activated carbon; and performing a post-treatment process of sieving, by a sieve, and drying, by an oven device, the coffee activated carbon and selecting coffee activated carbon particles having a particle diameter of 185 μm to 864 μm.

20. The method for manufacturing coffee activated carbon particles according to claim 19, wherein performing the main treatment process comprises:

performing, by the thermal decomposition furnace, a carbonization process of carbonizing the dried coffee powder particles; and performing an activation process of activating the carbonized coffee powder particles and manufacturing the coffee activated carbon.

* * * * *